United States Patent
Mestha et al.

(10) Patent No.: US 7,969,624 B2
(45) Date of Patent: Jun. 28, 2011

(54) METHOD AND SYSTEM FOR IDENTIFYING OPTIMAL MEDIA FOR CALIBRATION AND CONTROL

(75) Inventors: Lalit Keshav Mestha, Fairport, NY (US); Yao Rong Wang, Webster, NY (US); Zhigang Fan, Webster, NY (US); Alvaro Enrique Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1233 days.

(21) Appl. No.: 11/636,747

(22) Filed: Dec. 11, 2006

(65) Prior Publication Data

US 2008/0137110 A1 Jun. 12, 2008

(51) Int. Cl.
*H04N 1/46* (2006.01)
*H04N 1/00* (2006.01)

(52) U.S. Cl. ............ 358/504; 358/1.9; 358/406; 399/45

(58) Field of Classification Search .................. None
See application file for complete search history.

(56) References Cited

U.S. PATENT DOCUMENTS

| | | | |
|---|---|---|---|
| 4,553,033 A | 11/1985 | Hubble | |
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Twyler L Haskins
*Assistant Examiner* — Huo Long Chen
(74) *Attorney, Agent, or Firm* — Fay Sharpe LLP

(57) ABSTRACT

Disclosed herein are optimal or near optimal algorithms implemented as software tools that will allow the user/machine to identify optimal media out of the job set automatically. There are at least two main process steps to the exemplary embodiment. The first step involves the off-line characterization of the printing/image rendering system that will be used to extract the principal basis vectors from the experimental data. The second step involves the run-time mode, in which the pre-characterized basis vectors are used in conjunction with an optimal algorithm that will identify the media for re-calibration/re-characterization from the group of media set that the customer is interested to print. The optimal algorithm performs the combinatorial search every time the customer wishes to select the media. Once the optimal media is selected, the customer or the machine can print color patches (which are also optimal set) and execute the rest of the processing to reconstruct the best color management LUTs.

15 Claims, 4 Drawing Sheets

U.S. PATENT DOCUMENTS

| | | |
|---|---|---|
| 5,596,416 A | 1/1997 | Barry et al. |
| 5,629,762 A | 5/1997 | Mahoney et al. |
| 5,710,968 A | 1/1998 | Clark et al. |
| 5,749,020 A | 5/1998 | Mestha |
| 5,778,377 A | 7/1998 | Marlin et al. |
| 5,884,910 A | 3/1999 | Mandel |
| 5,963,244 A | 10/1999 | Mestha |
| 5,995,721 A | 11/1999 | Rourke et al. |
| 6,008,912 A | 12/1999 | Sato et al. |
| 6,059,284 A | 5/2000 | Wolf et al. |
| 6,125,248 A | 9/2000 | Moser |
| 6,241,242 B1 | 6/2001 | Munro |
| 6,280,105 B1 * | 8/2001 | Iida .................................. 400/74 |
| 6,297,886 B1 | 10/2001 | Cornell |
| 6,341,773 B1 | 1/2002 | Aprato et al. |
| 6,351,320 B1 * | 2/2002 | Shin ............................... 358/1.9 |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,654,136 B2 | 11/2003 | Shimada |
| 6,744,531 B1 | 6/2004 | Mestha et al. |
| 6,760,056 B2 | 7/2004 | Klassen et al. |
| 6,819,906 B1 | 11/2004 | Herrmann et al. |
| 6,925,283 B1 | 8/2005 | Mandel et al. |
| 6,934,053 B1 | 8/2005 | Mestha et al. |
| 6,959,165 B2 | 10/2005 | Mandel et al. |
| 6,973,286 B2 | 12/2005 | Mandel et al. |
| 6,975,418 B1 * | 12/2005 | Ohta et al. .................... 358/1.15 |
| 7,024,152 B2 | 4/2006 | Lofthus et al. |
| 7,123,873 B2 | 10/2006 | deJong et al. |
| 7,619,771 B2 * | 11/2009 | Jacob et al. ..................... 358/1.9 |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0136015 A1 | 7/2004 | Van de Capelle et al. |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2005/0036705 A1 | 2/2005 | Viassolo et al. |
| 2005/0099446 A1 | 5/2005 | Mizes et al. |
| 2006/0033771 A1 | 2/2006 | Lofthus |
| 2006/0066885 A1 | 3/2006 | Anderson et al. |
| 2006/0067756 A1 | 3/2006 | Anderson et al. |
| 2006/0067757 A1 | 3/2006 | Anderson et al. |
| 2006/0077488 A1 | 4/2006 | Zhang et al. |
| 2006/0077489 A1 | 4/2006 | Zhang et al. |
| 2006/0114313 A1 | 6/2006 | Moore |
| 2006/0114497 A1 | 6/2006 | Anderson et al. |
| 2006/0115284 A1 | 6/2006 | Grace et al. |
| 2006/0115287 A1 | 6/2006 | Roof |
| 2006/0115288 A1 | 6/2006 | Roof |
| 2006/0132815 A1 | 6/2006 | Lofthus et al. |
| 2006/0176336 A1 | 8/2006 | Moore et al. |
| 2006/0197966 A1 | 9/2006 | Viturro et al. |
| 2006/0209101 A1 | 9/2006 | Mizes |
| 2006/0214359 A1 | 9/2006 | Clark |
| 2006/0214364 A1 | 9/2006 | Clark et al. |
| 2006/0215240 A1 | 9/2006 | Mongeon |
| 2006/0221159 A1 | 10/2006 | Moore et al. |
| 2006/0221362 A1 | 10/2006 | Julien et al. |
| 2006/0222378 A1 | 10/2006 | Julien |
| 2006/0222384 A1 | 10/2006 | Moore et al. |
| 2006/0222393 A1 | 10/2006 | de Jong et al. |
| 2006/0227350 A1 | 10/2006 | Crawford et al. |
| 2006/0230201 A1 | 10/2006 | Fromherz et al. |
| 2006/0230403 A1 | 10/2006 | Crawford et al. |
| 2006/0233569 A1 | 10/2006 | Furst et al. |
| 2006/0235547 A1 | 10/2006 | Hindi et al. |
| 2006/0238778 A1 | 10/2006 | Mongeon et al. |
| 2006/0244980 A1 | 11/2006 | Grace |
| 2006/0250636 A1 | 11/2006 | Richards |
| 2007/0139734 A1 | 6/2007 | Fan et al. |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/215,791, filed Aug. 30, 2005, Hamby et al..
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.

U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.

U.S. Appl. No. 11/522,171, filed Sep. 15, 2006, Sampath et al.
U.S. Appl. No. 11/528,770, filed Sep. 27, 2006, Degruchy.
U.S. Appl. No. 11/545,176, filed Oct. 10, 2006, deJong et al.
U.S. Appl. No. 11/125,897, filed May 9, 2005, Mestha et al.
U.S. Appl. No. 11/314,670, filed Dec. 21, 2005, Fan et al.
U.S. Appl. No. 11/313,018, filed Dec. 20, 2005, Mizes et al.
U.S. Appl. No. 11/636,841, filed Dec. 11, 2006, Wang.

* cited by examiner

METHOD AND SYSTEM FOR IDENTIFYING OPTIMAL MEDIA FOR CALIBRATION AND CONTROL

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0115284-A1, Published Jun. 1, 2006, entitled "SEMI-AUTOMATIC IMAGE QUALITY ADJUSTMENT FOR MULTIPLE MARKING ENGINE SYSTEMS," by Robert E. Grace, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. 20031468-US-NP, Published Sep. 28, 2006, entitled "IMAGE QUALITY CONTROL METHOD AND APPARATUS FOR MULTIPLE MARKING ENGINE SYSTEMS," by Michael C. Mongeon;

U.S. Publication No. US-2006-0222384-A1, Published Oct. 5, 2006, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/189,371, filed Jul. 26, 2005, entitled "PRINTING SYSTEM," by Steven R. Moore, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/292,163, filed Nov. 30, 2005, entitled "RADIAL MERGE MODULE FOR PRINTING SYSTEM," by Barry P. Mandel, et al.; and U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen.

BACKGROUND

The present application relates to improved methods and systems for calibrating image rendering systems that deliver digital images on multiple media. It finds particular application in conjunction with document processing and image processing systems, and it will be described with particular reference thereto. However, it is to be appreciated that, some embodiments are amenable to other applications.

By way of background, it is known that media properties can affect the color response of a printer because of toner, surface and optical characteristics. One of the reasons different substrates can have different responses to the marking process is that they can have different spectral characteristics. Spectral characteristics are the way things respond to light. In the case of a printable substrate, it is how the substrate reflects, absorbs, and scatters light. Color reproduced in a glossy white substrate and a dark textured substrate is quite different.

To obtain consistent print quality across multiple media, different media specific color correction look up tables (LUTs) may be supported. Generally, these LUTs are constructed a priori using spectrophotometer measurements for known media. They are stored in the digital front end controller for use while RIPping the document. Full re-characterization on each media generally gives the best quality. However, when a printer is supported with a large media set (e.g., greater than 400 media), re-characterization on each media is very time consuming. Also, a typical user may print on 5 to 20 media in 1 day. Gray balance calibration is performed on a single media (e.g., DCG) in present systems such as iGen systems manufactured by Xerox Corporation. Although gray balance calibration on each media can further improve color quality (mostly along neutral), re-characterization is preferred since with re-characterization all the print engine colors can be improved. Even after using inline sensors, re-characterization on each media becomes time-consuming particularly for color-critical and time-critical customers. Within the print jobs, a reduced media set and color is preferred for re-characterization or gray balance calibration. An improved method of automatic optimal or near optimal (suboptimal) media selection for use by the operator or the machine prior to printing multiple media job is considered very valuable.

Typically, the user must recreate and change the color management LUTs and/or marking process parameters whenever media substrates change. It takes considerable experience to properly fine tune the LUTs or change marking parameters to obtain optimal performance. The required level of expertise is high and can lead to high cost to print shop vendors.

In U.S. application Ser. No. 11/125,897, filed May 9, 2005, entitled "METHOD TO AUTOMATICALLY IDENTIFY AND COMPENSATE FOR SUBSTRATE DIFFERENCES USING A SENSOR," by Lalit K. Mestha, et al., a method of calculating the degree of similarity between the test media substrate and all the pre-characterized substrates stored in the broad media database by using from the sensor measurements some measured media attributes (e.g., spectral reflectance of the substrate, special characteristics such as media fluorescence, other non-color-related attributes such as surface roughness, weight, thickness, gloss, etc.) was disclosed. A substrate from the database is chosen that is most similar to the test substrate along the chosen attribute. The test substrate then inherits the pre-built color correction LUTs that are associated with the chosen database substrate, which may then be used for managing color of the given job just before printing. This feature would be useful for many production printers to find the right media type so that jobs can be automatically re-routed on correct media.

However, there is a need for identifying the best media out of the set being considered so that re-characterization or re-calibration can be performed on minimal number of media set to obtain/reconstruct the most up-to-date color management LUT from those already available in the database. The approach described below can further improve the color quality on the media since at the time the customer wishes to print the printer state is measured and image colors are adjusted automatically for reproducing the best color when compared to using the old color management LUT that was created in the factory.

INCORPORATION BY REFERENCE

The following references, the disclosures of which are incorporated herein in their entireties by reference, are mentioned.

Two U.S. patent applications, U.S. application Ser. No. 11/314,670, filed Dec. 21, 2005, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS," by Zhigang Fan, et al. and U.S. application Ser. No. 11/313,018, filed Dec. 20, 2005, entitled "METHODS AND APPARATUSES FOR CONTROLLING PRINT DENSITY," by Howard A. Mizes, et al., describe the characterization processes used for determining optimal gray levels and optimal halftone screens, respectively.

U.S. Pat. No. 7,639,410, filed concurrently, entitled "OPTIMAL TEST PATCH SELECTION FOR MULTI-MEDIA PRINTING SYSTEMS," by Yao Rong Wang, et al. describes processes for determining optimal color values.

U.S. Pat. No. 5,963,244, issued Oct. 5, 1999 to Mestha, entitled "Optimal reconstruction of tone reproduction curve," describes a method of machine control including the recreation of a tone reproduction curve by providing a look up table.

U.S. Pat. No. 5,749,020, issued May 5, 1998 to Mestha, entitled "COORDINIZATION OF TONE REPRODUCTION CURVE IN TERMS OF BASIS FUNCTIONS," describes fundamental machine functions such as the Tone Reproduction Curve that are divided into regions of smaller units so that each unit can be interrelated to some aspects of the internal machine process.

U.S. Pat. No. 4,553,033, issued Nov. 12, 1985 to Hubble, entitled "INFRARED REFLECTANCE DENSITOMETER," describes an integral, compact infrared reflectance densitometer including a substrate supporting an LED, a control photodiode to compensate for component degradation, a background photodiode to compensate for background radiation, and a large area photodiode to provide an electrical signal representative of the amount of toner particles on the photosensitive surface.

U.S. Pat. No. 6,744,531, issued Jun. 1, 2004 to Mestha et al., entitled "COLOR ADJUSTMENT APPARATUS AND METHOD," describes an apparatus and method to achieve consistent output across plurality of different hardcopy devices.

U.S. Pat. No. 6,934,053, issued Aug. 23, 2005 to Mestha et al., entitled "METHODS FOR PRODUCING DEVICE AND ILLUMINATION INDEPENDENT COLOR REPRODUCTION," describes a method for obtaining spectrally matched color outputs using data from a real-time sensor, such as, for example, a spectrophotometer on the output trays of a marking device.

U.S. Publication No. 2004/0136015, published on Jul. 15, 2004, by Jean-Pierre R. N. Van de Capelle et al., entitled "ITERATIVE PRINTER CONTROL AND COLOR BALANCING SYSTEM AND METHOD USING A HIGH QUANTIZATION RESOLUTION HALFTONE ARRAY TO ACHIEVE IMPROVED IMAGE QUALITY WITH REDUCED PROCESSING OVERHEAD," describes a system and method to perform printer calibration spatially on the halftones while they are in a high quantization resolution form.

U.S. Pat. No. 6,760,056, issued Jul. 6, 2004 to Klassen et al., entitled "MACRO UNIFORMITY CORRECTION FOR X-Y SEPARABLE NON-UNIFORMITY," describes a describes a method for rendering a raster output level which determines an image position of a pixel of interest (POI) within an image. A final raster output level is determined as a function of the image position and the intended raster output level.

U.S. Publication No. 2005/0099446, published on May 12, 2005, by Mizes et al., entitled "SYSTEMS AND METHODS FOR COMPENSATING FOR STREAKS IN IMAGES," describes a method for compensating for streak defects in an image formed using an image forming device.

U.S. 2005/0036705, published on Feb. 17, 2005, by Viassolo et al., entitled "ACTIVE COMPENSATION OF STREAKS USING SPATIAL FILTERING AND FEEDBACK CONTROL," describes an image processing method for reducing streaking on a printed sheet.

BRIEF DESCRIPTION

The exemplary embodiment disclosed herein provides for optimal or near optimal algorithms implemented as software tools that will allow the user/machine to identify optimal media for updating color management LUTs out of the job set automatically. There are at least two main process steps to the exemplary embodiment. The first step involves the off-line characterization of the printing/image rendering system that will be used to extract the principal basis vectors from the experimental data. The second step involves the run-time mode, in which the basis vectors constructed from the characterization or re-characterization data matrix are used in conjunction with an optimal algorithm that will identify the media for re-calibration/re-characterization from the group of media set that the customer is interested to print. The optimal algorithm performs the combinatorial search every time the customer wishes to select the media. Once the optimal media is selected, the customer or the machine can print color patches (which can also be an optimal set obtained from the teachings of U.S. Pat. No. 7,639,410, filed concurrently, entitled "OPTIMAL TEST PATCH SELECTION FOR MULTI-MEDIA PRINTING SYSTEMS," by Yao Rong Wang, et al.) and execute the rest of the processing to reconstruct the best color management LUTs.

In accordance with another aspect of the exemplary embodiment, the off-line characterization step further comprises printing a plurality of colors on a set of media at different times, measuring the colors with color sensors, forming a characterization data matrix, and storing the characterization data matrix in a database.

In accordance with yet another aspect of the exemplary embodiment, the run-time step further comprises: selecting a media set; forming a new characterization data matrix, performing singular value decomposition on the new characterization data matrix and obtaining an eigen vector matrix, obtaining an optimal media performance curve and selecting a number of calibration media based on desired accuracy criterion, searching for the optimal combination of calibration media, printing and measuring a plurality of colors on selected optimal combination of calibration media, and receiving the optimal media and running the normal calibration and re-characterization process.

In accordance with yet another aspect of the exemplary embodiment there is provided an image rendering system comprising: a user interface, a print engine, one or more color sensors, a database, and a controller. The controller is operative to: perform an off-line characterization of the image rendering system for a set of media; and identify the optimal media for re-calibration and re-characterization from the set of media and perform re-calibration and re-characterization during run-time.

In accordance with yet another aspect of the exemplary embodiment, the controller is further operative to: print a plurality of colors on the set of media at different times; measure the colors with the one or more color sensors; form a characterization data matrix; and store the characterization data matrix in the database.

In accordance with yet another aspect of the exemplary embodiment, the controller is further operative to: select a new media set; form a new characterization data matrix; perform singular value decomposition on the new characterization data matrix and obtain an eigen vector matrix; obtain an optimal media performance curve and select a number of calibration media based on desired accuracy criterion; search for the optimal combination of calibration media; print and measure a plurality of optimal colors on selected optimal combination of calibration media; and run the calibration and re-characterization process by computing the change and updating a calibration look up table.

In accordance with yet another aspect of the exemplary embodiment, there is provided a storage medium storing a set of program instructions executable on a data processing device and usable to identify optimal media for calibration and control of an image rendering system. The set of program instructions comprises: instructions for performing an off-line characterization of the image rendering system for a set of media; and instructions for identifying the optimal media for re-calibration and re-characterization from the set of media and performing re-calibration and re-characterization during run-time.

In accordance with yet another aspect of the exemplary embodiment, the off-line characterization instructions further comprise: instructions for printing a plurality of colors on a set of media at different times; instructions for measuring the colors with color sensors; instructions for forming a characterization data matrix; and instructions for storing the characterization data matrix in an off-line characterization database.

In accordance with yet another aspect of the exemplary embodiment, the run-time instructions further comprise: instructions for selecting a media set; instructions for forming a new characterization data matrix; instructions for performing singular value decomposition on the new characterization data matrix and obtaining an eigen vector matrix; instructions for obtaining an optimal media performance curve and selecting a number of calibration media based on desired accuracy criterion; instructions for searching for the optimal combination of calibration media; instructions for printing and measuring a plurality of optimal colors on selected optimal combination of calibration media; and instructions for running the calibration and re-characterization process by computing the change and updating a calibration look up table.

DETAILED DESCRIPTION

Figure 1:
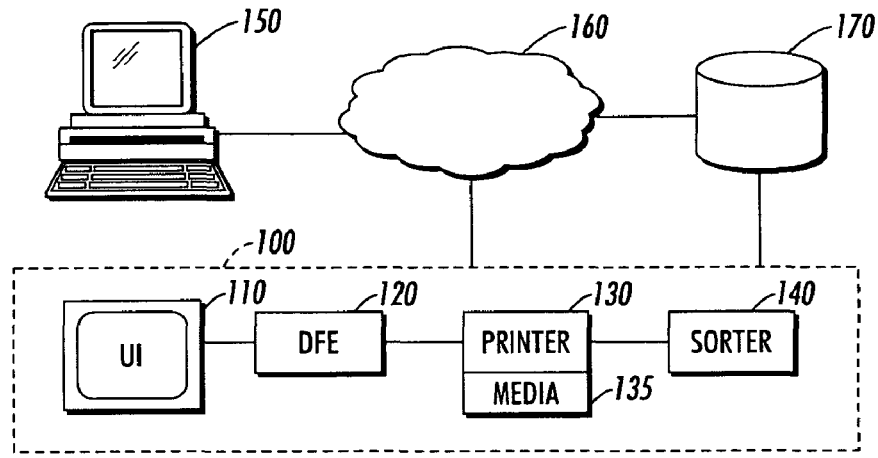
FIG. 1 illustrates components of a printing system utilized in accordance with carrying out the embodiments.

Some portions of the detailed description that follows are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices, just to mention a few examples.

With reference now to FIG. 1, a printing system (or image rendering system) 100 suitable for implementing aspects of the exemplary embodiments is illustrated. The printing system 100 includes a user interface 110, a digital front end (DFE) controller 120, and a print engine 130. The printing system 100 is generally assumed to be a printer, however, it is within the scope of the disclosure for the printing system 100 to be a copier. The print engine 130 has access to media 135 of various sizes and cost for a print job. A "print job" or "document" is normally a set of related sheets, usually 1 or more collated copy sets copied from a set of original print job sheets or electronic document page images, from a particular user, or otherwise related. For submission of a regular print job (or customer job), digital data is generally sent to the printing system 100. A sorter 140 operates after a job is printed by the print engine 130 to manage arrangement of the hard copy output, including cutting functions. A user can access and operate the printing system 100 using the user interface 110 or via a workstation 150. The workstation 150 communicates with the printing system 100 via a communications network 160. A user profile, work product for printing, media library, and print job parameters can be stored in a database or memory 170 accessible by the workstation 150 or the printing system 100 via the network 160, or can be directly accessed via the printing system 100. One or more color sensors (not shown) may be embedded in the printer paper path, as known in the art.

The printing system 100 may incorporate "tandem engine" printers, "parallel" printers, "cluster printing," "output merger" or "interposer" systems, and the like, as disclosed, for example, in U.S. Pat. No. 4,579,446 to Fujino, et al.; U.S. Pat. No. 4,587,532 to Asano; U.S. Pat. No. 5,489,969 to Soler, et al.; U.S. Pat. No. 5,568,246 to Keller, et al.; U.S. Pat. No. 5,570,172 to Acquaviva; U.S. Pat. No. 5,596,416 to Barry, et al.; U.S. Pat. No. 5,995,721 to Rourke, et al.; U.S. Pat. No. 6,554,276 to Jackson, et al., U.S. Pat. No. 6,654,136 to Shimida; and U.S. Pat. No. 6,607,320 to Bobrow, et al., the disclosures of all of these references being incorporated herein by reference.

A typical parallel printing system is one which feeds paper from a common paper stream to a plurality of printers, which may be horizontally and/or vertically stacked. Printed media from the various printers is then conveyed from the printers to a common finisher where the sheets associated with a single print job are assembled.

Described below are the optimal or near optimal algorithms implemented as software tools that will allow the user/machine to identify optimal media out of the job set automatically. There are at least two main process steps to the exemplary embodiment. The first step involves an off-line characterization of the printing/image rendering system that will be used to extract the principal basis vectors from the experimental data. The second step occurs in run-time mode, in which the pre-characterized basis vectors are used in conjunction with an optimal algorithm that will identify the media for re-calibration/re-characterization from the group of media set that the customer is interested to print. The optimal algorithm performs the combinatorial search every time the customer wishes to select the media. Once the optimal media is selected, the customer or the machine can print color patches (which are also optimal set) and execute the rest of the processing to reconstruct the best color management LUTs.

The optimal algorithm performs the maximum dispersion search in the field every time the customer wishes to select the media. The brute force method is generally slow, particularly when the number of media to be printed in the media set is successively large. For those cases, a specialized genetic algorithm to perform the run-time optimization search may be used. Once the optimal media is selected, the customer or the machine can print color patches (which are also optimal set) and execute the rest of the processing to reconstruct the best color management LUTs.

Figure 2:
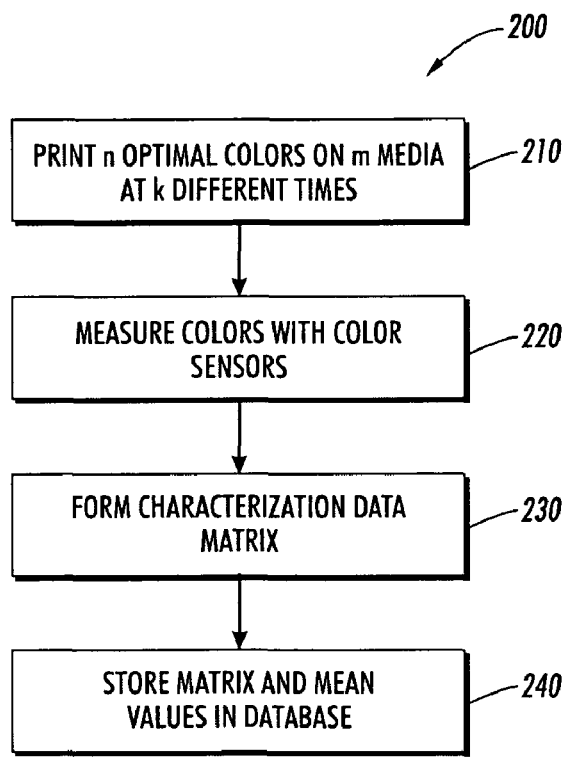
FIG. 2 is a flow chart of an exemplary off-line media characterization method.

In FIG. 2, the off-line media characterization method 200 is illustrated. The off-line characterization method is required in order to find the minimal number of basis vectors and the color values from the media set. The steps required for off-line media characterization and run-time media calibration are described in greater detail below.

Figure 3:
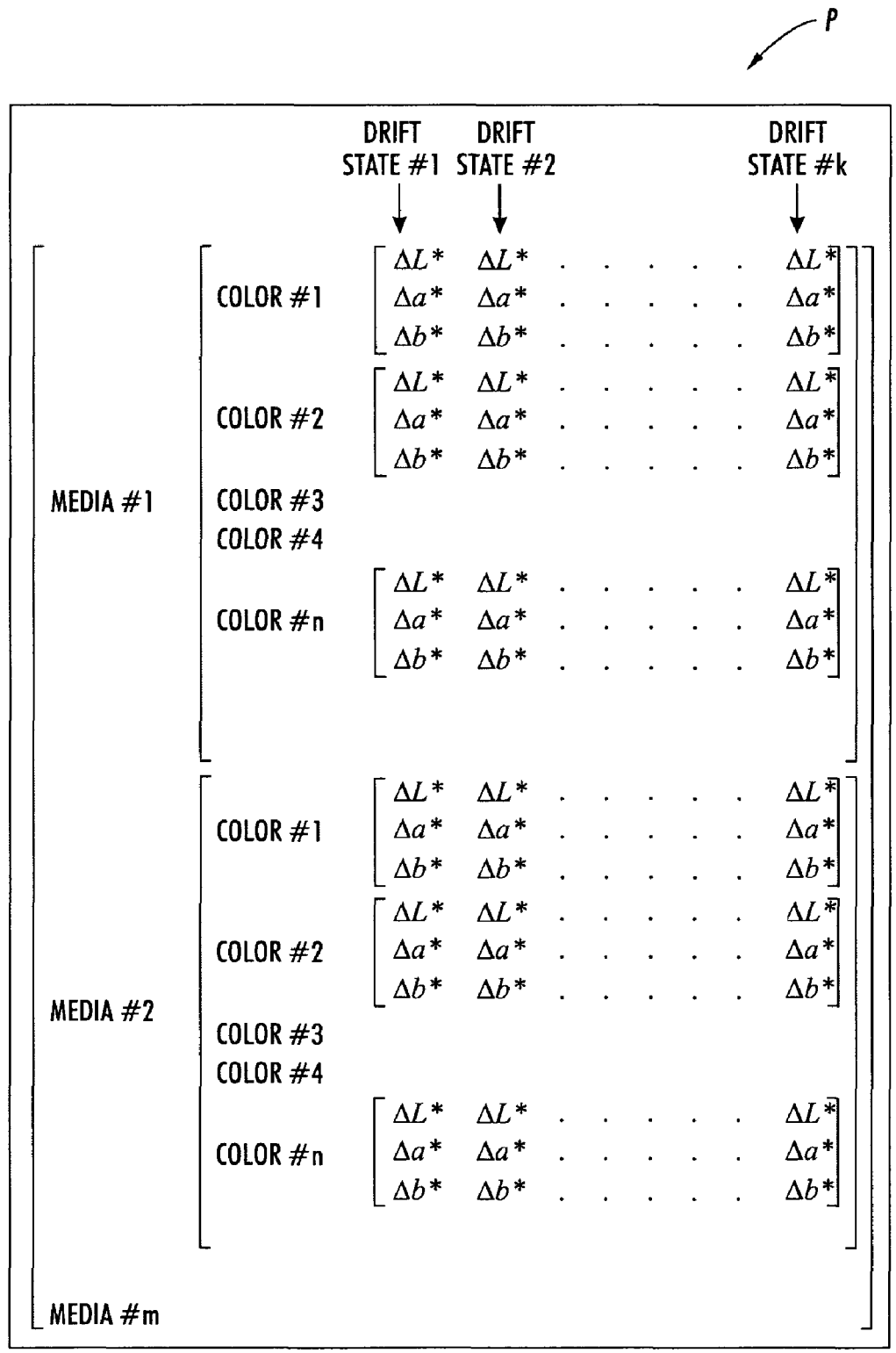
FIG. 3 illustrates the format of an exemplary data characterization matrix.

The off-line characterization method 200 generally involves the printing and measuring of a reasonably large set of colors for each media. Thus, the first step (210) is to print n colors on m media at different times so that drifting of the printer 100 is well represented. Next, the colors are measured with color sensors (220). The P matrix (or characterization data matrix) is then formed, where each column is at a selected drift state and the column contains the measured color information for all the media (230). It should be noted here that this P matrix may be formed by removing the centroid (or average) of each color of each media across multiple drift states. The characterization data matrix can also be formed without removing the centroid. One possible format for the P matrix is shown in FIG. 3. Of course, it is to be understood that the elements describing the color could be 4 (instead of $L^*a^*b^*$), 5, 6 or even 31. For 31 values we can describe the color parameters as reflectances.

The color set may be selected from the optimal or sub-optimal calibration set, as described, for example, in U.S. Pat. No 7,639,410, filed concurrently, entitled "OPTIMAL TEST PATCH SELECTION FOR MULTI-MEDIA PRINTING SYSTEMS," by Yao Rong Wang, et al. Or, alternatively, for slightly less desirable results, the color set may be selected from a pre-determined calibration set representing the printer's color gamut. The printer 130 is chosen to operate for nominal characterization setpoints. The term "nominal characterization setpoints" refers to the various process setpoints, such as charge, exposure intensity, development bias voltage, transfer current, and fuser temperature, held to nominal operating values.

If there are m media to be calibrated, then the calibration color set contains n colors (each color with L*, a*, b*values) and the printer drifting is represented in k time intervals. Thus, the matrix dimension equation may be represented as:

$$W=(3*m*n) \times k, \quad (1)$$

where the number "3" is required to show that colors contain 3 parameters. Thus, when 4, 5, 6, ..., or 31 parameters are used, this number will assume the corresponding value. Printer drift state sampled discretely in the characterization stage can be variably induced in the printer at different setpoints or can be obtained from the field data.

The P matrix should be saved for run time calibration in the off-line characterization database 170 (240). Also, the mean values of the characterization data matrix are stored in the database 170 for later use when they are used.

Since the general goal of the characterization process is to select optimal media for use during run-time calibration/characterization, there is no particular requirement for the test set during run-time to have prints made on the optimal media for different setpoints. And since the exemplary embodiment is more focused on the optimal media, the matrices to be constructed for finding basis vectors require color data for a variety of media within the printable media space.

Often there will be requirements in the field to optimally set/determine the marking process setpoints with respect to media parameters. For example, media weight, media thickness, etc., are other parameters that may be included in the columns of the data matrix by augmenting the color parameters.

The step of grouping the data in the form of a matrix is described more fully below. Turning now to FIG. 3, let P be a matrix (also called a characterization data matrix) obtained with mean removed for each column containing color and media parameters. P is a data matrix of size W of media parameter values with M=3*m*n rows and k columns. And let $x_i$ represent the column vectors for i=1, 2, ..., k printer drifts.

We apply Principal Component Analysis (PCA) to the data matrix, which is a mathematical procedure that transforms a number of (possibly) correlated variables into a number of uncorrelated variables called principal components. The first principal component accounts for as much of the variability in the data as possible, and each succeeding component accounts for as much of the remaining variability as possible. Singular Value Decomposition ("SVD") is a mathematical operation performed to identify principal components. The SVD technique provides a representation of the multivariate data as a linear combination of orthonormal basis vectors, wherein each successive basis vector accounts for as much of the variation in the original data as possible. The singular values of the multivariate set of data correspond to orthonormal eigenvectors of the sample matrix ordered according to decreasing magnitude of eigen values.

Thus, the eigen functions may be obtained as follows:

$$SVD(PP^T)=U\Sigma V^T, \quad (2)$$

where the M×M matrix U and the M×M matrix V contain the eigen functions and the matrix $\Sigma$ is diagonal and contains the square of the rank-ordered eignvalues (or singular values). Based on the ratios of the lowest to highest eigen values in the $\Sigma$ matrix, one can decide on the total number of eigen functions required for optimization.

The set of media names used for calibration/re-characterization that possess the maximum dispersion provides the minimum prediction error between the optimal media set and the full set (for example, all 400 media as in current iGen printers manufactured by Xerox Corp.), which can be obtained by using algorithms disclosed, for example, in U.S. application Ser. No. 11/314,670, filed Dec. 21, 2005, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS," by Zhigang Fan, et al. In that application, an optimal method was disclosed for test patch selection. Specifically, for a given number of patches, the proposed method determines a set of color patches that will yield the measurement of color errors with the highest accuracy.

To select the optimal media set, it is necessary to find the combinations of the media that give minimum trace of a matrix which may be expressed as $tr[(H^TH)^{-1}]$, where H is a (3*S*n)×N matrix and S is the number of media used in the search process which is less than m, and N is the number of eigen functions along the drift direction. The rows of H are selected from the U matrix rows. For example, the rows of H matrix for one particular media combination with 10 media (say, 1, 8, 9, 25, 100, 120, 135, 180, 200, 220) and 182 colors (say, IT8 colors) contains 3*10×182 rows with corresponding rows of media and color L*a*b*values according to the format described in the data matrix of FIG. 3. Now, U matrix rows are chosen corresponding to the H matrix rows. H and U are reduced matrices obtained for the combination chosen during the combinatorial search procedure.

Experimental verification was done on 17 media types on a Xerox iGen3 printer with each media type printed with 182 IT8 color patches. The 17 media are listed in Table 1 below.

TABLE 1

1. DC Elite Gloss (3R11450, 80 lb)
2. DC Elite Gloss (100 lb, 140 gsm)
3. DC Elite Gloss (80 lb, 210 gsm)
4. DC Graphics (120 gsm, 80 lb)
5. DC Supreme Gloss (3R11192, 219 gsm)
6. DC Graphics 28 (70 lb, 105 gsm)
7. DC Supreme Gloss (184 gsm)
8. DC Xpress (24 lb, 90 gsm)
9. DC Xpress (28 lb, 105 gsm)
10. DC Xpress (32 lb, 120 gsm)
11. DC Xpress98 (28 lb, 105 gsm)
12. Supreme Recycle (247 gsm)
13. DC Xpress (163 gsm, 60 lb)
14. Supreme Gloss (219 gsm)
15. DC Xpress98 (270 gsm, 3R11160)
16. DC Xpress98 (80 lb, 216 gsm)
17. Supreme Gloss (247 gsm)

Figure 4:
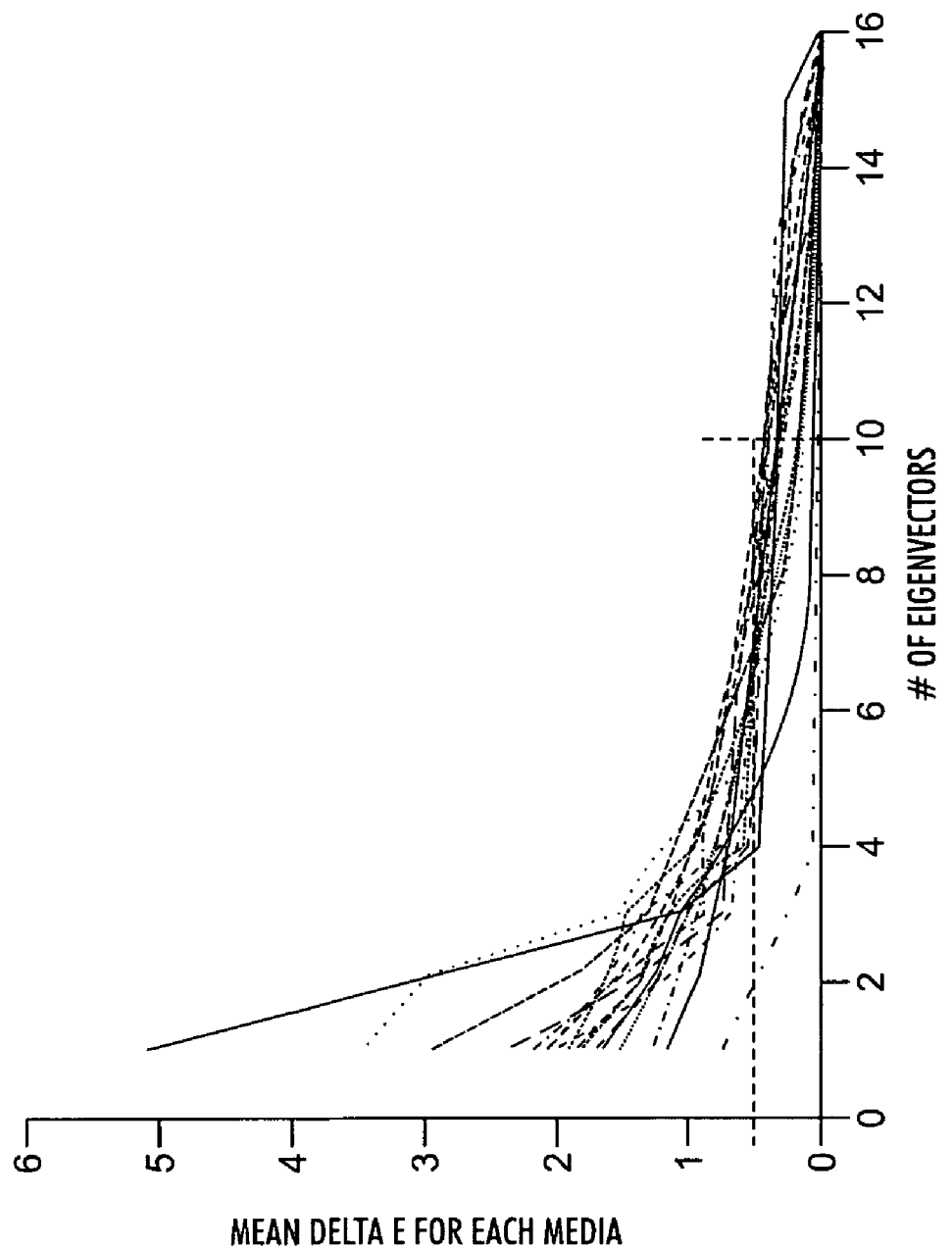
FIG. 4 is a graph of the predicted delta error with respect to eigen vectors for an iGen3 printer in accordance with aspects of the exemplary embodiment.

As one can see from Table 1, the types of media selected for the experiment varied from very thick to very thin, and from highly glossed to recycled papers. Six sets of prints for each color set and for each media were collected at different times representing the printer drift. Following the steps described for the data matrix P, one can construct FIG. 4 for the media in Table 1. Each curve in FIG. 4 represents the deltaE (in CIE Lab space) accuracy curve for a given media. DeltaE is obtained by comparing the actual measurements to the calculated L*a*b*values using different number of rank ordered eigen vectors. The x-axis of FIG. 4 represents the number of eigenvectors with highest ranking used while performing deltaE calculations. This resulted in the use of 6-7 eigen functions, implying that only 6-7 media types (see FIG. 4 for the media performance curve for this example) are needed to stay within tolerable delta E errors (approx. 0.5). This gave rise to 2× improvement in the number of media required for measurements.

The next question to be answered for our example is, which of 7 media are best suited for calibration. This question can be answered by minimizing the quantity $J=tr[H^T H)^{-1}]$, as described above. To form the matrix H, the first step is to obtain the number of rank ordered eigen functions along the drift direction. Note that the eigen functions used here have fewer elements than those used in FIG. 4 depending on the selected media combination as described in paragraph 55. Since the first singular value from the SVD analysis on the data matrix for the example shown in Table 1 (with 182 colors and 17 media) is about 25 times larger than the second one, and the second one is about 6 times larger than the third one, 2 eigen functions are enough for this example. Also, one can chose to include 6 or 7 eigen vectors. Instead of 182 colors, one can also choose to use the optimal color set obtained from the teachings disclosed in U.S. Pat. No. 7,639,410, filed concurrently, entitled "OPTIMAL TEST PATCH SELECTION FOR MULTI-MEDIA PRINTING SYSTEMS," by Yao Rong Wang, et al. The H matrix can now be formed from these eigen functions for any combinations of media. For example, for media combination with seven media {1, 3, 4, 6, 10, 11, and 16}, the dimension of the H matrix is therefore 3822×2 (where 3822=3×7×182). The value of J is calculated for 19448 [19448=17!/(17−7)!*7!] of such media combinations, and the combination corresponding to the minimum value of J is the optimal combination. For this example, the optimal media for calibration are Nos, 3, 5, 7, 10, 12, 14 and 17 (with two eigenvectors) after calculating and comparing the value of J for all 19448 combinations. It is interesting to note that this media set, while representing each type of paper, also favors heavily on supreme gloss papers.

Figure 5:
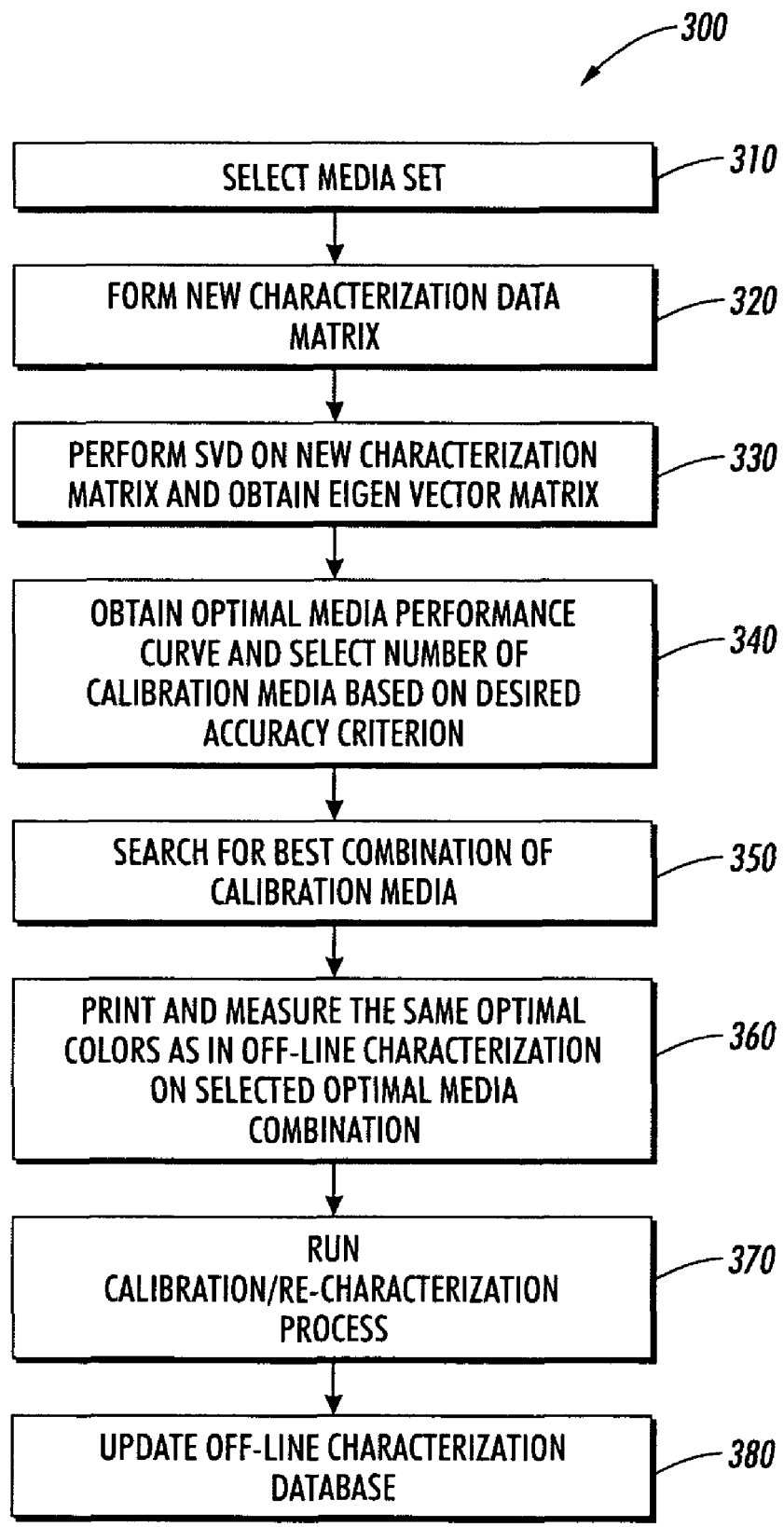
FIG. 5 is a flow chart of an exemplary run-time media selection method.

Typically, for a 400 media set, one might expect to have greater than 20 optimal media. This means that re-characterization would be required on every one of those greater than 20 media to keep the media LUT ready for use in the image path. This would be extremely time-consuming, particularly so when the customer may not be interested to print on those greater than 20 optimal media set. Therefore, a run-time media selection method is needed. Such a method 300 is illustrated in FIG. 5.

During run-time calibration/re-characterization mode, the customer may have the desire to print on a reduced set consisting of m1 media. For example, 20 media on day 1, 15 different media on day 2, and so on. For this kind of scenario, the customer may not use the optimal media set obtained in the factory using the methods described in previous paragraphs.

Initially, the media set (e.g., Media #1, 3, 8, 20 . . . ) with total number m1 for the day's printing job is selected (310).

Next, the new P matrix is formed from the P matrix saved after the off-line characterization (320) described in previous paragraphs. The elements of the new P matrix are the same as the corresponding elements chosen for the selected media number from the off-line P matrix. An SVD analysis is performed on the new P matrix and the eigen vector matrix U is obtained (330).

The optimal media performance curve is obtained (as in FIG. 4), selecting the number of calibration media s1 based on desired accuracy criterion (340).

The best (optimal) combination of the calibration media is determined (350) for s1 media. The H matrix is formed using eigenvectors U (from step 330). The search process will find the optimal set for that job, which is not the optimal set for all media set (i.e., 400 in our example) allowed for the printer. Calculate $J=tr[(H^T H)^{-1}]$ for all combinations.

The same colors as in the off-line characterization are printed and measured on the selected optimal media combination shown in step 350 (360).

Once the user picks the optimal media (output of step 350), the calibration/re-characterization process can be run and other media can be updated by using the methods shown below (370). First, using the eigen functions described above to "fit" to the new measured calibration color set on the optimal media (consisting of s1 media) set, a set of coefficients is obtained from least square fitting. Second, using the coefficients, modifications to L*, a* and b* values of the media color LUTs for all m1 media (shown by vector X below) are obtained as follows:

$$X = \overline{X} + U \cdot \alpha, \quad (3)$$

where X is a vector with the updated L*, a* and b* values for the m1 media arranged corresponding to each column of the data matrix in step 320, $\overline{X}$ is the mean value of the columns of the data matrix for the m1 media in step 320, and a is the coefficient set from fitting to the measurements of the calibration colors from the s1 media. A new calibration LUT is thus obtained for the m1 media.

If the customer wants to update the off-line characterization database (380), the customer can do so by replacing the old colors of the optimal media with the new measured colors of the optimal media selected from Step 350.

The teachings of U.S. Pat. No 7,639,410, filed concurrently, entitled "OPTIMAL TEST PATCH SELECTION FOR MULTI-MEDIA PRINTING SYSTEMS," by Yao Rong Wang, et al., may be used in step 360 to obtain optimal colors (i.e., a much reduced set). Disclosed therein is a method which comprises several aspects of defining and using optimal test patches over the entire gamut for calibration. One aspect is the methodology of sampling during a characterization mode and sampling in an update (calibration) mode. Sampling in the characterization mode is performed with a large number of colors and over a range of print engine performance (environmental conditions, media, etc.). The fineness of the color sampling in such local variation is observed. For example, this initial sampling may need to be over the full 256 levels for each C, M, Y and K separation and their combinations. More likely, fewer levels, e.g., 13, may well characterize the printer gamut. For multi-media calibration, this set of color patches may be printed and measured for each media. From this finely and broadly sampled state, basis vectors and an initial set of weights are derived using formalism such as SVD on differences from a mean performance. The number of basis will be reduced to remove noise and improve efficiency of computation, storage, and patch usage. The reduction in basis vectors is the low rank approximation of the system. Various references on spatial Tone Reproduction Curves (or TRCs) describe this process. See, for example, U.S. application Ser. No. 11/314,670, filed Dec. 21, 2005, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS," by Zhigang Fan, et al.; U.S. Publication No. 2006/0077488, entitled METHODS AND SYSTEMS ACHIEVING PRINT UNIFORMITY USING REDUCED MEMORY OF COMPUTATIONAL REQUIREMENTS, by Zhigang Fan, et al.; and U.S. Publication No. 2006/0077489, entitled UNIFORMITY COMPENSATION IN HALFTONED IMAGES, by Zhigang Fan, et al., the disclosures of which are incorporated herein in their entireties by reference.

Then, the teachings of the exemplary embodiment are used as color data (i.e., L*,a*b*) to update the full color management LUT for all 1 to n colors using the standard procedures.

The DFE controller 120 can perform all of these functions. In addition, other options include performing these functions in a separate interface processor between the DFE 120 and the print engine 130. Also, the print engine processor can perform these functions. Thus, appropriate new color correction LUTs can be obtained for all the media to be printed on that day. Additionally, it may be desirable to automatically set certain print conditions with non-color attributes (such as fusing speed and temperature) based on the selection of the optimal media, which can be coordinated by the job controller.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of identifying optimal media for calibration and control of an image rendering system, the method comprising:
    performing an off-line characterization of the image rendering system for a set of media; and
    identifying an optimal media for re-calibration and re-characterization from the set of media used during run-time by:
    selecting a new media set:
    forming a new characterization data matrix;
    performing singular value decomposition on the new characterization data matrix and obtaining an eigen vector matrix;
    obtaining an optimal media performance curve and selecting a number of calibration media based on desired accuracy criterion;
    searching for the optimal combination of calibration media;
    printing and measuring a plurality of optimal colors on selected optimal combinations of calibration media; and
    running the calibration and re-characterization process.

2. The method of claim 1, further comprising performing re-calibration and re-characterization on the optimal media during run-time.

3. The method of claim 1, wherein the off-line characterization step further comprises:
    printing a plurality of colors on the set of media at different es;
    measuring the colors with color sensors;
    forming a characterization data matrix; and
    storing the characterization data matrix in an off-line characterization database.

4. The method of claim 1, wherein the run-time step further comprises:
    updating the off-line characterization database by replacing the old colors of the media with the new measured colors of the optimal media.

5. The method of claim 4, wherein the off-line characterization step further comprises:
    printing a plurality of colors on the set of media at different times;
    measuring the colors with color sensors; and
    forming a characterization data matrix.

6. An image rendering system comprising:
    a user interface;
    a print engine;
    one or more color sensors;
    a database;
    a controller operative to:
    perform an off-line characterization of the image rendering system for a set of media; and
    identify an optimal media for re-calibration and re-characterization from the set of media and perform re-calibration and re-characterization during run-time by;
    selecting a new media set;
    forming a new characterization data matrix;
    performing singular value decomposition on the new characterization data matrix and obtaining an eigen vector matrix;
    obtaining an optimal media performance curve and selecting a number of calibration media based on desired accuracy criterion;
    searching for the optimal combination of calibration media;
    printing and measuring a plurality of optimal colors on selected optimal combinations of calibration media; and
    running the calibration and re-characterization process.

7. The system of claim 6, wherein the controller is further operative to perform re-calibration and re-characterization on the optimal media during run-time.

8. The system of claim 6, wherein the controller is further operative to:
    print a plurality of colors on the set of media at different times;
    measure the colors with the one or more color sensors;
    form a characterization data matrix; and
    store the characterization data matrix in the database.

9. The system of claim 6, wherein the controller is further operative to:
    update the database by replacing the old colors of the media with the new measured colors of the optimal media.

10. The system of claim 9, wherein the controller is further operative to:
    print a plurality of colors on a set of media at different times;
    measure the colors with color sensors;
    form a characterization data matrix; and
    store the characterization data matrix in the database.

11. A non-transitory computer-usable data carrier storing a set of program instructions executable on a data processing device and usable to identify optimal media for calibration and control of an image rendering system, the set of program instructions comprising:
    instructions for performing an off-line characterization of the image rendering system for a set of media; and
    instructions for identifying an optimal media for re-calibration and re-characterization from the set of media and performing re-calibration and re-characterization during run-time by:
    selecting a new media set;
    forming a new characterization data matrix:
    performing singular value decomposition on the new characterization data matrix and obtaining an eigen vector matrix;
    obtaining an optimal media performance curve and selecting a number of calibration media based on desired accuracy criterion;

searching for the optimal combination of calibration media;

printing and measuring a plurality of optimal colors on selected optimal combinations of calibration media; and running the calibration and re-characterization process.

12. The non-transitory data carrier of claim 11, wherein the set of program instructions further comprises instructions for performing re-calibration and re-characterization on the optimal media during run-time.

13. The non-transitory data carrier of claim 11, wherein the off-line characterization instructions further comprise:

instructions for printing a plurality of colors on a set of media at different times;

instructions for measuring the colors with color sensors;

instructions for forming a characterization data matrix; and instructions for storing the characterization data matrix in an off-line characterization database.

14. The non-transitory data carrier of claim 11, wherein the run-time instructions further comprise instructions for updating the off-line characterization database by replacing the old colors of the media with the new measured colors of the optimal media.

15. The non-transitory data Garner of claim 14, wherein the off-line characterization instructions further comprise:

instructions for printing a plurality of colors on a set of media at different times;

instructions for measuring the colors with color sensors;

instructions for forming a characterization data matrix; and instructions for storing the characterization data matrix in an off-line characterization database.

* * * * *